Figure 1:
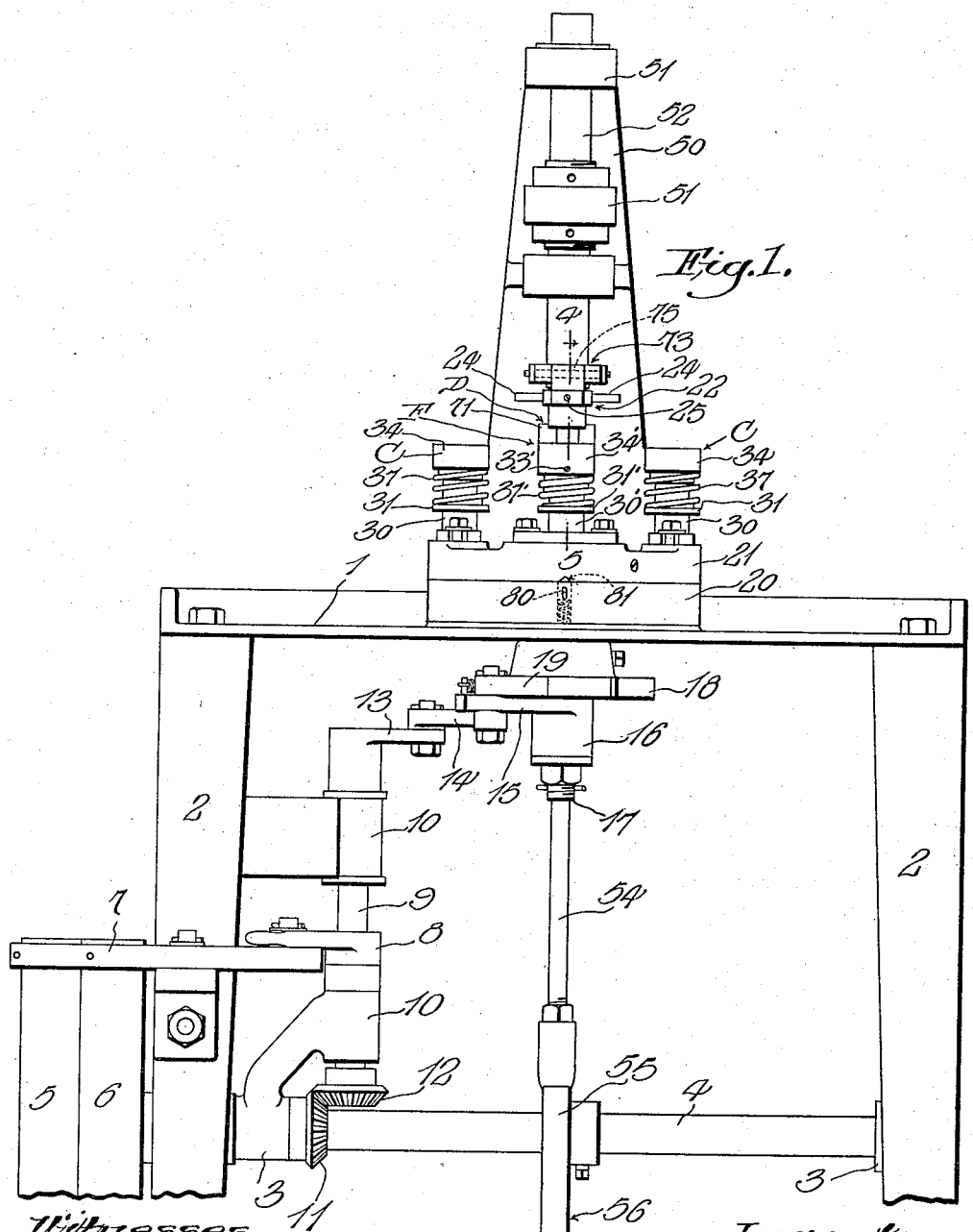

A. R. & J. R. LOPEZ.
BUTTON MAKING MACHINE.
APPLICATION FILED DEC. 10, 1914.

1,152,111.

Patented Aug. 31, 1915.
4 SHEETS—SHEET 3.

Witnesses,
H. Woodard
E. Clements

Inventors,
Abraham R. Lopez
Jacob R. Lopez,
By H. B. Willson & Co
Attorneys

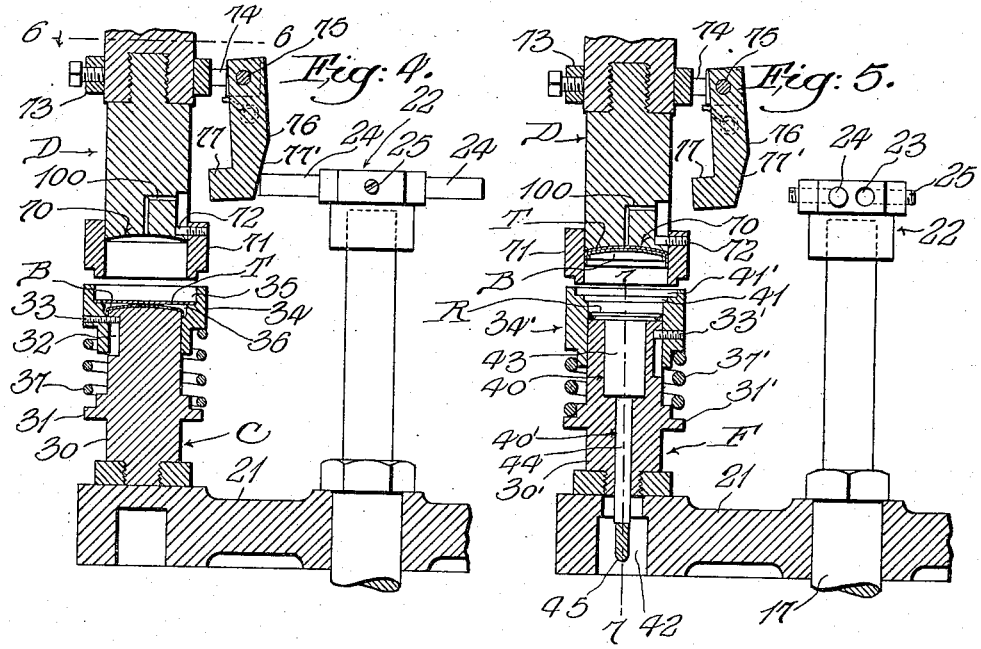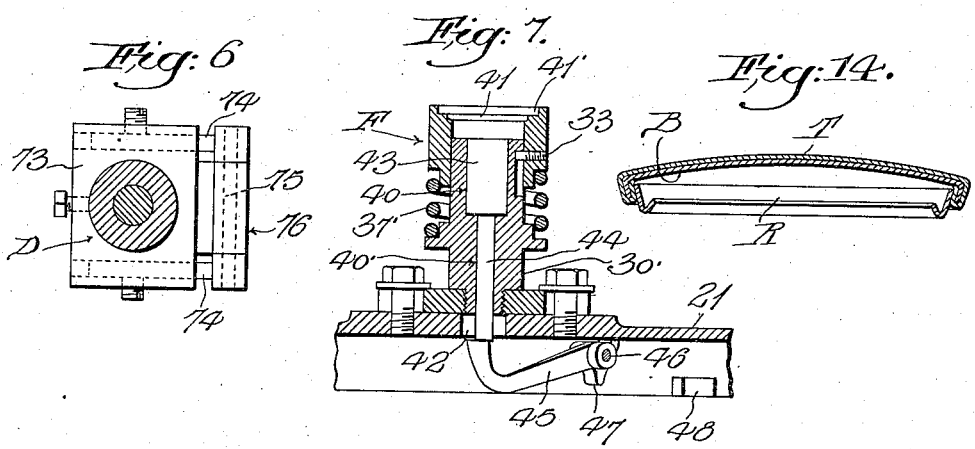

UNITED STATES PATENT OFFICE.

ABRAHAM R. LOPEZ AND JACOB R. LOPEZ, OF BOSTON, MASSACHUSETTS.

BUTTON-MAKING MACHINE.

1,152,111.  Specification of Letters Patent. Patented Aug. 31, 1915.

Application filed December 10, 1914. Serial No. 876,548.

*To all whom it may concern:*

Be it known that we, ABRAHAM R. LOPEZ and JACOB R. LOPEZ, citizens of the United States, residing at Boston, in the county of Suffolk and State of Massachusetts, have invented certain new and useful Improvements in Button-Making Machines; and we do declare the following to be a full, clear, and exact description of the invention, such as will enable others skilled in the art to which it appertains to make and use the same.

Our invention relates to improvements in machines for the manufacturing of buttons of a type sometimes called campaign buttons, and for the making of any buttons to be covered either by celluloid or cloth.

The main object of the invention is to provide a comparatively simple machine which will readily perform the functions for which it is designed and which may be easily operated by unskilled laborers.

In carrying out the above object, a vertically reciprocating plunger is provided, said plunger having a die on its lower end, which die is surrounded by a vertically movable collar. Beneath the plunger is an intermittently rotated table carrying two or more sets of dies, one set having means coacting with the collar when the same is projected.

A further object of the invention is to provide novel means for projecting a dog whereby to retain said collar in extended position when one of the dies with which it coacts, is correctly positioned.

Yet another object is to provide a simple automatic means for discharging the completed buttons.

Figure 2:
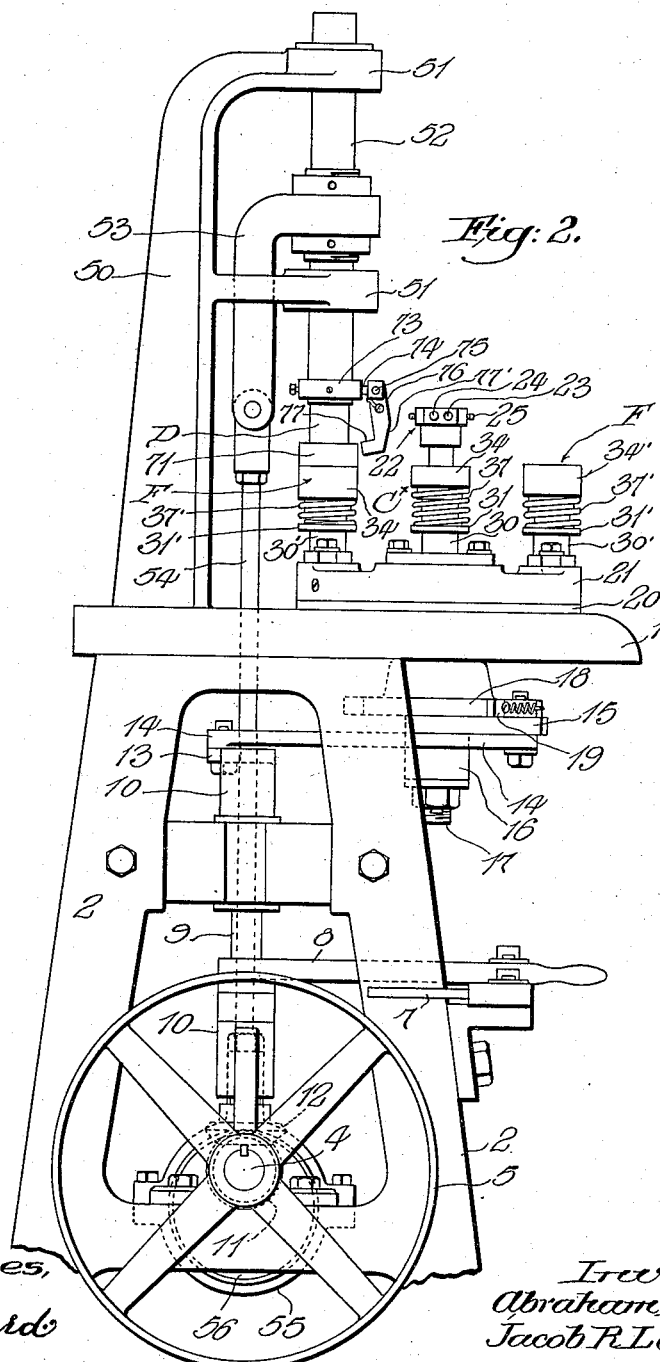
Figure 3:
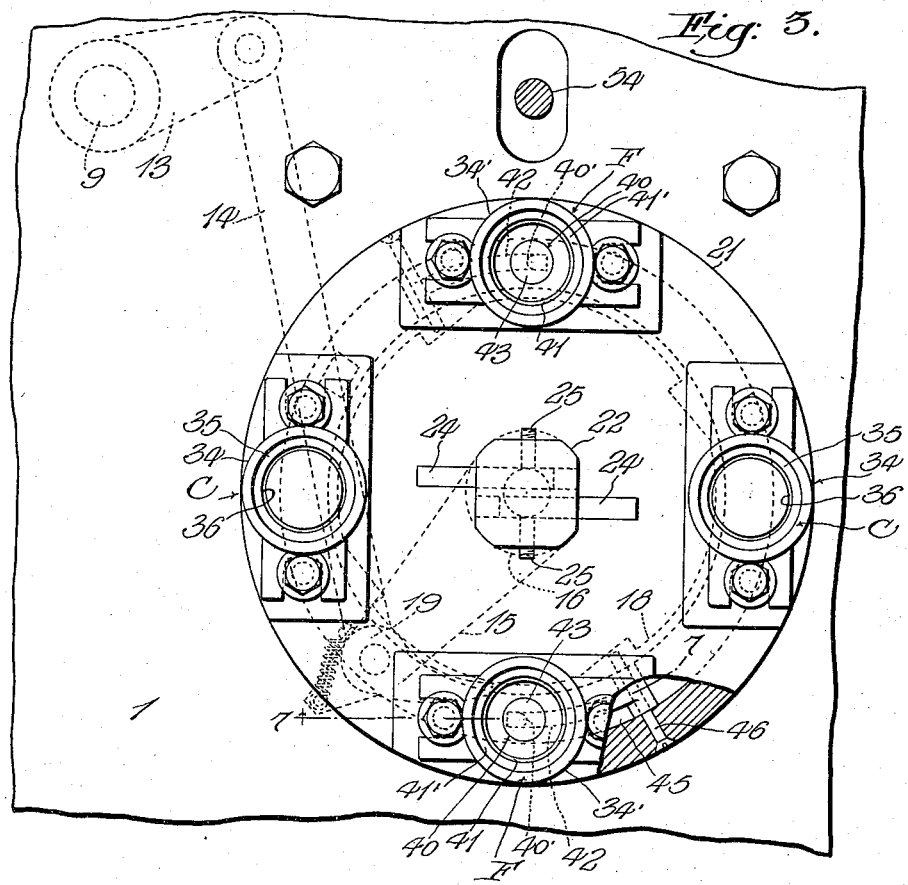
Figure 8:
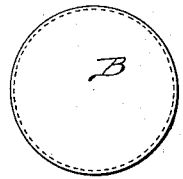
Figure 10:
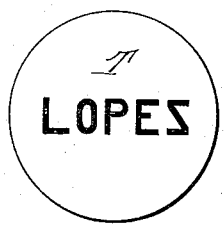
Figure 12:
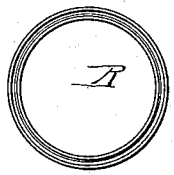
Figure 9:
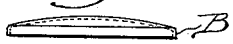
Figure 11:
Figure 13:
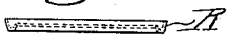

With the above and minor objects in view, the invention resides in certain novel features of construction and combination herein described and claimed and shown in the drawings wherein:

Figures 1 and 2 are respectively front and side views of the machine; Fig. 3 is a top plan view of a portion thereof; Figs. 4 and 5 are detail vertical sections taken along the plane of the line 4—5 of Fig. 1 showing the table in different positions with respect to the plunger D; Fig. 6 is a horizontal section as seen on the line 6—6 of Fig. 4; Fig. 7 is a detail vertical section taken substantially on the line 7—7 of Fig. 3 and illustrating the button discharging mechanism; Figs. 8 and 9 are respectively top and edge views of the body of the button; Figs. 10 and 11 are respectively top and edge views of the covering therefor; Figs. 12 and 13 are respectively top and edge views of the locking ring; and Fig. 14 is a vertical section of a completed button.

In the accompanying drawings forming a part of this application and in which like reference characters designate corresponding parts throughout the various views, the numeral 1 designates a rigid table top which is supported upon suitable legs 2. Spaced beneath the top 1 and revolubly mounted in appropriate bearings 3 carried by the legs, is a horizontal shaft 4, one of whose ends is provided with fixed and loose pulleys 5 and 6 in connection with which, an appropriate form of belt shifter 7 is provided, said shifter being pivoted to an operating lever 8 which is loose upon an upright shaft 9.

The shaft 9 is mounted in bearings 10 and is driven by a beveled pinion 11 on the shaft 4, said pinion meshing with a second pinion 12 on said shaft 9. The upper end of the last named shaft carries an arm 13 which is fixed thereon and which is pivoted to one end of a link 14, the opposite end of said link being pivoted to a pawl carrying arm 15 which is provided with a hub 16. The hub 16 rotates freely upon an upright shaft 17 which rises an appropriate distance above the table 1. Fixed upon the shaft 17, above the arm 15, is a ratchet 18 with which a spring projected pawl 19, mounted on the arm 15 coacts. By this means, since the arm 13 is of less length than the arm 14, the latter will be oscillated as the former is rotated by the means previously described, this oscillation imparting an intermittent rotary movement to the shaft 17, through the instrumentality of the pawl 19.

Rigidly mounted upon the top 1 is a cylindrical boss 20 through and above which the shaft 17 projects, said shaft carrying a movable table 21 whose lower side contacts with the boss 20.

By reference to the various figures of the drawings, it will be seen that the shaft 17 rises above the table 21 and rigidly carries a head 22 on its upper end, said head having a pair of parallel guide openings 23 in which a pair of dog projecting pins 24 are adjustably mounted and held against movement by set screws 25. By this construction, the table 21 and the head 22 will be rotated intermittently as the shaft 17 is rotated.

Mounted at diametrically opposite points on the table 21, is a pair of capping dies C, while a second pair of finishing dies F are likewise mounted on said table and spaced 90° from the dies C. It will be noted, more particularly by reference to Fig. 3 that pins 24 project toward the capping dies C, this being important for reasons to be hereinafter set forth.

The capping dies C include upright posts 30 which are provided with annular flanges 31 near their lower ends and with upright slots 32 near their upper ends, said upper ends being rounded as seen in Fig. 4. Slidably mounted upon the upper ends of the posts 30 and having pins 33 projecting into the slots thereof, are collars 34, said collars having the upper ends of their bores enlarged to provide cap retaining seats 35 and flange receiving seats 36, the latter receiving the depending flanges of the button bodies B, as seen in Fig. 4, while the former support the covers or tops T as likewise seen in said figure. It will be noted that coil springs 37 are interposed between the collars 34 and the flanges 31, thereby normally forcing the former upwardly.

The finishing dies F include posts 30' whose upper ends are provided with cylindrical bores 40 from which reduced bores 40' extend, the latter opening into an annular groove 42 formed in the bottom of the table 21. The posts 30' are provided with annular stop flanges 31', and with vertically sliding collars 34' forced normally upward by coil springs 37' and limited in their upward movement by pins 33. The upper ends of the bores of the collars 34' are provided with annular grooves 41 designed to bend the tops T in a manner to be set forth, and, above the grooves 41, with enlarged seats 41'.

Mounted for vertical sliding movement in the bores 40 are button removing plungers 43 which are provided with depending stems 44, the latter projecting into the groove 42 and contacting with the upturned ends of L-shaped arms 45, the latter being pivoted within the grooves upon screws 46 which intersect the same, and being provided with depending trip noses 47. The noses 47 are disposed in the path of a trip 48 which rises from the boss 20, whereby the arms 45 will be rocked to raise the plungers 43, when the table 21 rotates to such an extent as to allow the noses 47 to contact with the trips 48. This upward movement of the plungers 43 discharges the completed buttons in a manner to be hereinafter set forth.

Rising from the rear side of the top 1 is an upright bracket 50 which is equipped with a pair of forwardly projecting bearings 51 which overlie the rear edge of the table 21, said bearings being provided for the mounting of a vertically reciprocating shaft or plunger 52, the latter being equipped with an inverted L-shaped bracket 53 to whose lower end a connecting rod 54 is pivoted, said rod passing through a slot in the top 1 and having an eccentric band 55 on its lower end. The band 55 surrounds an eccentric 56 which rotates with the shaft 4. By this means, the plunger 52 is reciprocated vertically simultaneously with the intermittent rotation of the table 21.

The plunger 52 removably carries a die D on its lower end, said die being here shown in the form of a post having its lower end dished as seen at 70, said dished end coacting with the rounded upper end of the post 30. Slidably mounted upon the die D and having a shouldered end projecting below the same, is a collar 71 whose downward movement is limited by a stop pin 72 which slides freely within a slot in one side of the die. At times, it becomes expendient to provide means whereby the collar 71 is prevented from moving upwardly, while at other times it is essential that said collar be allowed to move. For allowing such action to take place, I provide the means now to be described.

Locked against movement upon the plunger 52, is a collar 73 which is provided with a pair of guide openings in which parallel laterally projecting pins 74 are adjustably mounted, said pins having heads on their outer ends which carry a transverse pivot pin 75 upon which the upper end of a spring retracted dog 76 is mounted, the lower inner side of said dog having a nose 77 designed to be positioned above the collar 71, while its outer lower corner is beveled downwardly and inwardly as seen at 77' to provide a cam for coaction with the pins or fingers 24 as seen in Fig. 4. When the parts stand in this position, the downward movement of the plunger 52 causes the cam 77' to contact with one of the pins, thereby moving said dog inwardly and preventing an appreciable amount of upward movement on the part of the collar 71.

With the parts as above described, the operation of the machine is as follows: One of the flanged bodies B is positioned upon the rounded upper end of one of the posts 30, the depending flange of said body then being located within the groove 36 of the collar 34. A top, constructed of celluloid or other appropriate material, is now dropped into the seat 35. The timed operation of the pawl and ratchet, now rotates the table 21 to position the die C (it being understood that this is the die in which the body and top have been positioned), at a point beneath the die D, at which point it is yieldingly held against movement by a spring projected stud 80 which slides vertically in an opening in the boss 20 and is designed to successively engage a plurality of depressions 81 formed in the bottom of the table 21.

By reference to Fig. 4, it will be seen that the pin 24 is positioned in contact with the cam 77', at the same time the die C is moved beneath the die D. The last named die is now forced downwardly by the eccentric 56 thereby moving the dog 76 inwardly to prevent excessive upward movement of the collar 71, when the latter contacts with the collar 34. Continued downward movement of the die D and collar 71 now depresses the collar 34 against the tension of the spring 37 thereby bending the edge of the top T downwardly around the curved body B.
As the plunger and the die D are now raised, the top and body, will remain within the collar 71 and will be formed as seen in Fig. 5. By the time the plunger 52 has moved to its limit of upward movement, however, the pawl and ratchet mechanism has rotated the table 21 to such an extent to position one of the finishing dies F beneath the die D (see Fig. 5). A clamping ring R has previously been positioned within the bore of the collar 34' on the upper end of said die F and as said die D now descends, the collar 71 contacts with the collar 34' and said die then moves downwardly through said collar 74, thereby forcing the partially completed button downwardly. As the button descends, the downturned edge of the top contacts with the wall of the groove 41 which curves the same inwardly to the position seen in Fig. 14, while still further downward movement depresses the collar 34' and forces the ring R into contact with said inwardly curved edge, thereby completing the button which now appears as seen in Fig. 14. As the plunger makes its next upward stroke, the table 21 is rotated to cause one of the noses 47 to contact with the trip 48, thereby raising the plunger 43 within the die just employed, and discharging the completed button.
It has been found by experience that the partially completed buttons are prone to stick within the collars 71, this being due to the fact that a partial vacuum is created when said buttons are removed. To overcome this difficulty, we have provided an air vent 100 which leads from the dished lower end of the die D through one side thereof. This vent allows air to enter the collar as the button is discharged therefrom, thereby preventing the creation of a partial vacuum.

A machine constructed as above described and shown in the drawings possesses numerous advantageous features and may be operated, to advantage by unskilled laborers, this being an important item in the cheap manufacture of buttons of the class above described.

We have described but two capping dies and two finishing dies, but it will be readily understood that any desired number could be employed and, in fact, but one capping die and one finishing die would operate to advantage, in which case the table 21 would properly oscillate rather than rotate.

We claim:

1. A button making machine comprising a vertically movable non-oscillatory plunger, a die carried thereby, a collar encircling the lower end of the die and through which said end may slide, a normally retracted dog carried by the plunger and adapted to be projected into the path of upward movement of the collar, a table beneath the plunger and mounted for partial rotation, a second and a third die carried by said table and adapted to be successively disposed beneath the first die, and means on the third die for coaction with the aforesaid collar; in combination with a rigid standard rising from and secured to the table, and a rigid dog projecting finger extending laterally from said standard and disposed in the downward path of the dog to move the dog into the path of upward movement of the collar when the third die is disposed beneath the first-named die and the collar thereon.

2. A button forming machine comprising a vertically reciprocating non-oscillatory plunger, a die carried thereby, a collar encircling the lower end of said die and through which said end may slide, a normally retracted dog pivoted to the plunger and adapted to be projected into the path of upward movement of the collar, a dog projecting cam carried by said dog, an intermittently moved table beneath the plunger, a second and a third die on said table and adapted to be successively positioned beneath the first die, and means on the third die for coaction with the aforesaid collar; in combination with a dog projecting member carried by and rising from the table and disposed in the downward path of the aforesaid cam to move the dog into the path of upward movement of the collar, when the third die is disposed beneath the first-named die and the collar thereon.

3. A button forming machine comprising a vertically reciprocating non-oscillatory plunger, a collar surrounding the lower end of said plunger and through which said end may slide, a normally retracted dog pivoted to the plunger and adapted to be projected into the path of upward movement of said collar, a dog projecting cam on said dog, an intermittently moved table beneath the plunger, a second and a third die on said table and adapted to be successively disposed beneath the first die, and means on the third die for coaction with the aforesaid collar; combined with a rigid standard rising from and movable with said table, and a rigid dog projecting finger extending laterally from said standard and disposed in the downward path of the aforesaid cam to move the dog into the path of upward movement of the collar, when the third die is positioned beneath the first-named die and the collar thereon.

4. A button forming machine comprising a vertically movable die, a horizontal table beneath the same and capable of partial rotation, a hollow die carried by said table, a plunger mounted for vertical movement in said hollow die, an arm pivoted at one end beneath and to the table and contacting at its free end with the lower end of the plunger, a trip nose depending from the pivoted end of the aforesaid arm, and a fixed arm raising cam disposed in the path of said nose, whereby to raise said arm and project the plunger when the table is rotated.

In testimony whereof we have hereunto set our hands in presence of two subscribing witnesses.

ABRAHAM R. LOPEZ.
JACOB R. LOPEZ.

Witnesses:
E. PHILIP FINN,
GEORGE W. GIOVANNETTI.

Copies of this patent may be obtained for five cents each, by addressing the "Commissioner of Patents, Washington, D. C."